Nov. 29, 1960

W. D. BOZMAN 2,961,973

AUTOMATIC WARE CAR CONVEYOR

Filed April 30, 1957

INVENTOR.
WILLIAM D. BOZMAN
BY Darby & Darby
ATTORNEYS

Nov. 29, 1960 W. D. BOZMAN 2,961,973
AUTOMATIC WARE CAR CONVEYOR
Filed April 30, 1957 3 Sheets-Sheet 2
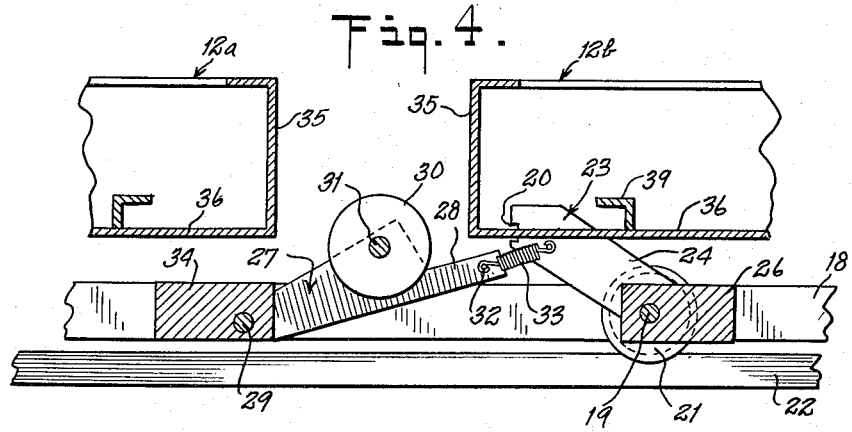
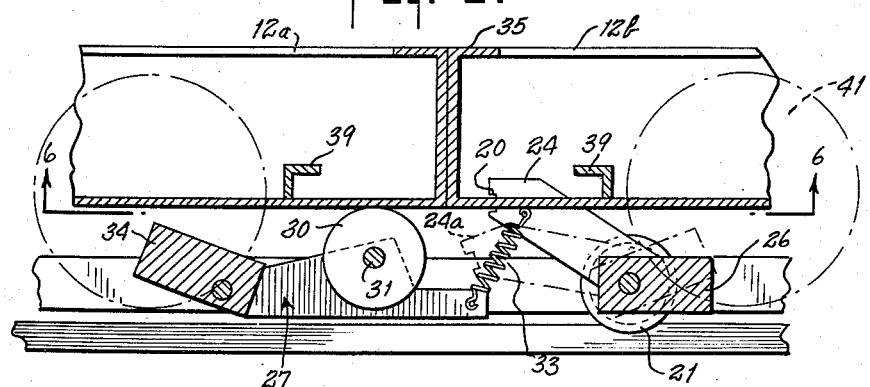
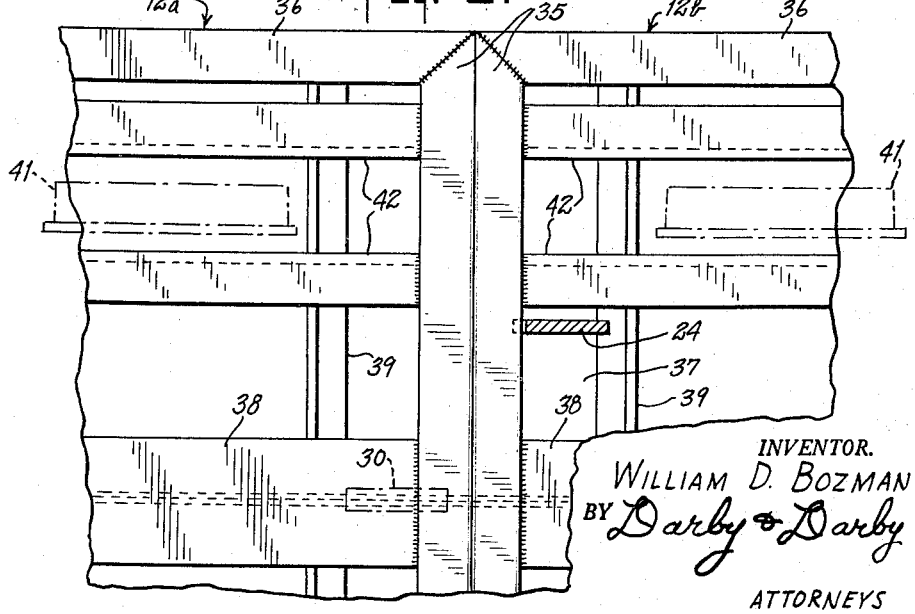
INVENTOR.
WILLIAM D. BOZMAN
BY Darby & Darby
ATTORNEYS Nov. 29, 1960 W. D. BOZMAN 2,961,973
AUTOMATIC WARE CAR CONVEYOR
Filed April 30, 1957 3 Sheets-Sheet 3

INVENTOR.
WILLIAM D. BOZMAN
BY Darby & Darby
ATTORNEYS

United States Patent Office 2,961,973
Patented Nov. 29, 1960

2,961,973

AUTOMATIC WARE CAR CONVEYOR

William Dale Bozman, Columbus, Ohio, assignor to Hanley Company, Pittsburgh, Pa., a corporation of Pennsylvania Filed Apr. 30, 1957, Ser. No. 656,146

7 Claims. (Cl. 104—162)

The present invention relates to a conveyor system for rail cars and particularly to such a conveyor system which is especially adapted to move ware cars, such as those utilized in the manufacture of brick and tile, from place to place in storage and cooling rail yards.

It is an object of the present invention to provide a system for moving rail cars on storage tracks to automatically vacate the entrance of said tracks until such time as the storage track is full of rail cars.

It is another object of the present invention to provide a system of the nature described above which moves rail cars in such a manner that jarring and other abrupt motion of the cars is avoided.

It is still another object of the present invention to provide a rail car conveyor system to move rail cars along a storage track which includes means for avoiding pushing the cars beyond the end of a storage track.

It is a further object of the present invention to provide a system for moving rail cars on tracks in a desired manner without the necessity for attendance of operating personnel.

Further objects and advantages will appear from a consideration of the following description in conjunction with the appended drawings, in which Fig. 1 is a top plan view of a portion of a rail yard incorporating the present conveyor system;

Fig. 4 is a side elevational view of the car-engaging unit of Fig. 2, also showing the cooperation of the car-engaging unit with a rail car;

Fig. 5 is a second side elevational view of the device of Fig. 4 showing the cooperation of the device with two rail cars;

Fig. 6 is a plan view taken along the line 6—6 in Fig. 5, showing the bottom of two ware cars and illustrating the manner in which the car-engaging unit is designed to cooperate with a typical ware car as shown in Fig. 6;

In the manufacture of brick, tile and similar products, hereinafter referred to as "ware," a substantial portion of the processing takes place with the ware stacked on flat-bed rail cars, generally called "ware cars."

It is necessary that substantial numbers of these cars be loaded with ware and stored before final shipment of the end product. For example, the cars must be stored for cooling of the ware and preparatory to sorting of the ware and for other purposes.

The storage of ware cars is generally accomplished by transporting the cars to a series of parallel storage tracks and pushing the cars onto the storage tracks until they are needed. The cars are then generally removed from the opposite end of the storage tracks to the location where they are required.

Figure 1:
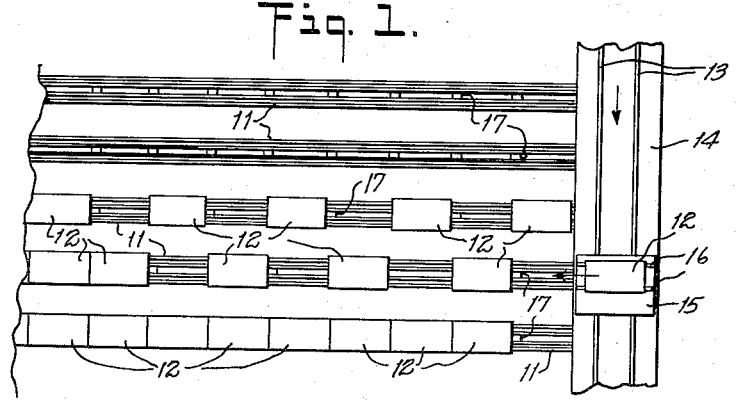

Fig. 1 shows a typical storage track arrangement. Five parallel storage tracks are shown at 11. A number of ware cars 12 are located on various ones of the storage tracks. The ware cars are brought to the storage tracks over a transverse track 12 which is located in a recess 14 below the level of the storage tracks 11. A transfer car 15 runs along the transverse track 13. The bed of the transfer car 15 is level with the storage tracks 11. The bed of the transfer car 15 is provided with tracks 16 which are of the same gauge as the storage tracks 11.

A ware car may thus be transported to the storage tracks 11 by means of the transfer car 15 which of course may be powered in any suitable manner. Transfer car 15 may also be provided with suitable means for pushing a ware car 12 off of the transfer car 15 onto the storage tracks 11.

The foregoing arrangement does not constitute the present invention but an explanation of the general character of the operation is necessary for a full understanding of the utility of the present invention. It will be obvious from the previous explanation that some means must be provided in the arrangement explained above for moving the ware cars 12 along the storage tracks (to the left in Fig. 1) so that further ware cars may be placed upon the tracks.

The method generally utilized prior to the present invention was to provide intermediate tracks between the storage tracks 11 on which a pusher car could run parallel to the storage tracks. Extensions were provided on the pusher car extending over the storage tracks to engage the ware cars and thus allow them to be moved from place to place on the storage tracks. This method required at least one pusher car and operator and also required that the pusher car be operated rather carefully to avoid undue jarring of the ware cars. It should be noted that the handling of the ware cars must be done with extreme care. It is not feasible for example, to utilize a gravity type handling system such as is commonly used in railroad freight yards. The jarring occasioned by such an arrangement would be entirely too great, since the ware cars are stacked quite high with relatively small pieces of ware and thus even slight jarring of the car will almost inevitably cause damage or dislocation of the ware.

The present invention resides in the provision for automatic ware car conveyors 17 located along each of the storage tracks 11. These conveyors 17 automatically engage the ware cars as they are placed on the storage track (to the left in Fig. 1), and move them forward, so that further cars may be placed on the track.

The construction of the car conveyor will be understood by reference to Figs. 2 through 5. The conveyor 17 consists of two long bars 18 running substantially the length of the storage track. Conveyor tracks 22 are provided within storage tracks 11. At intervals along the bars 18 there are provided wheels 21 rotatably mounted on repsective shafts 19.

The wheels 21 are adapted to roll upon and engage the conveyor track 22 and thus the bars 18 may be moved back and forth lengthwise of the storage track with a minimum of force, due to the reduction of friction accomplished by the conveyor wheels 21.

Although the arrangement shown is believed to provide the best embodiment of the invention, it is readily apparent that the wheels 21 might be mounted in a stationary position and the bars 18 might be arranged so that they are supported by and rolled along the wheels 21. As a matter of fact, wheels 21 might in some cases be eliminated and other means for supporting the conveyor provided.

Figure 2:
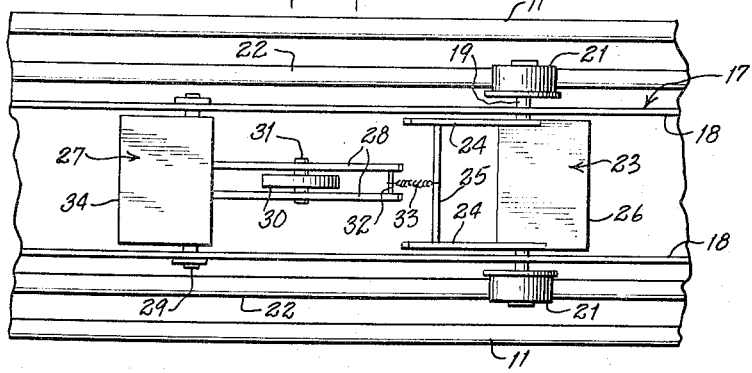
Fig. 2 is a top plan view of a portion of the conveyor system showing a single car-engaging unit.

Located at car-length spacings along the bars 18 are car-engaging units 23. In Fig. 2 the car-engaging unit 23 is shown rotatably mounted on the same shaft 19 that is utilized to mount the conveyor wheels 21. It is not necessary that the wheels 21 be located at the same position as the car-engaging unit 23, and if desired, the car-engaging unit could be independently pivotally mounted at a different position.

Figure 3:
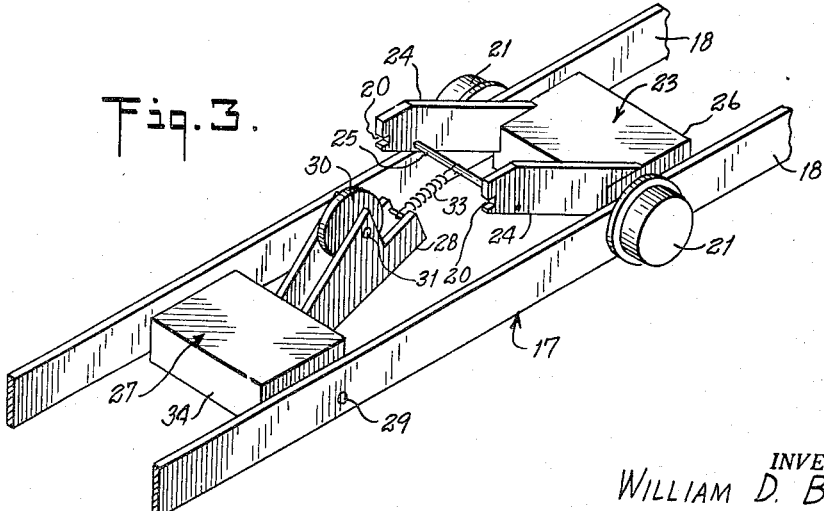
Fig. 3 is an isometric view of the car-engaging unit shown in Fig. 2.

Engaging arms 24 are provided on the car-engaging unit 23. These engaging arms are spaced from either side of the center of the car-engaging unit 23. Arms 24 may be connected by a brace member 25. The arms 24 are normally retained in their upward position by a counterweight 26 forming a part of the car-engaging unit 23. When in their upward position, as shown in Figs. 3 and 4, the arms 24 stand above the bottom of a ware car 12 and a slot 20 is provided in each arm 24 so that a portion of the ware car 12 is engaged thereby.

It is desired, for reasons which will later be explained, that the car-engaging unit 23 be arranged to be inoperative when a second car is located immediately in front of the car related to a particular car-engaging unit 23. This function is provided by the car-sensing unit 27 having upwardly extending roller arms 28 and being pivotally mounted to the bars 18 by means of a shaft 29. A roller 30 is rotatably mounted on a shaft 31 and is located between the roller arms 28 and thus is situated approximately midway between the storage tracks 11.

The roller arms 28 may be connected by a brace member 32. The car-sensing unit 27 and the car-engaging unit 23 are coupled together by means of a spring 33 which may be connected for example between the brace member 32 and the brace member 25.

As previously explained, it is desired for a preferred operation of the conveyor system that each of the ware cars be moved during a cycle of movement of the conveyor bars 18 only if there is no ware car in the position immediately forward of the above mentioned ware car. The manner in which this is accomplished may best be seen by reference to Figs. 4 through 6.

In Fig. 4 it will be noted that while there is no ware car located over the car-sensing unit 27, the roller 30 will be urged to its upward position due to the weight of the counterweight 34. Since the engaging arms 24 are similarly urged to their upward position by the counterweight 26, then the car-engaging arms 24 will be in their upward position and thus located to engage the forward or left end of a ware car 12.

It will be understood that in the operation of the conveyor system the conveyor bars 18 will be cyclically reciprocated through slightly more than one ware car length. This movement will normally push cars in the progression of one car length in stepwise fashion along the length of the storage track.

Assume that the ware car 12b shown in Fig. 4 has been moved by reciprocation of the conveyor bars 18 to a position where it is adjoined at the forward end by another ware car 12a, as shown in Fig. 5. It will be noted in Fig. 5 that as the ware car 12b approaches ware car 12a the car-sensing unit 27 is depressed as the roller 30 comes in contact with the under side of the ware car 12a. The engaging arms 24 are not immediately depressed, however, as the slot 20 of the engaging arms 24 engages a flange of a forward member 35 of the ware car 12b. The depression of the car-sensing unit 27 thus causes an extension of the spring 33. The solid lines of Fig. 5 therefore illustrate the position of the car-sensing and car-engaging units at the end of the forward travel of the conveyor bars 18. When the conveyor bars 18 start the return portion of their cycle the roller 20 will continue to roll along the surface of ware cars 12a and 12b. As the engaging arms 24 are moved to the right the slot 20 will cease to engage the structural member 35 of the ware car 12b. At this time the tension in the spring 33 will cause the car-engaging arms 24 to be depressed, as shown in dotted lines at 24a in Fig. 5. The strength of the spring 33 is sufficiently great to overcome the weight of the counter-balance 26. It will thus be seen that the engaging arms 24 will thereafter be rendered inoperative to move a successive ware car until the war car 12b has been moved from the position shown in Fig. 5.

Fig. 6 shows the construction of the bottom of a typical ware car. The ware car is generally constructed of a heavy structural material such as steel channels or the like. The ware cars of Fig. 6 are constructed to cooperate with the particular arrangement of car-sensing unit and car-engaging unit shown in Fig. 2. It will be observed that the transverse structural members 35 have a horizontal flange which is positioned so that it will be engaged by the slot 20 of the engaging arms 24, as shown in Figs. 4 and 5 and also in Fig. 6. Longitudinal structural members 36 and 38 are also provided for the ware car and these members are so located that there is a space 37 adapted to receive the upwardly extending car-engaging arms 24, as shown in Fig. 6. The longitudinal members 38 on the other hand run the full length of the cars 12. Thus a track or support is provided throughout the length of the car for the roller 30 of the car-sensing unit 27.

Other structural members 39 and 42 and wheels 41 may be arranged in any manner which will not interfere with the above described operation.

It should be understood that the construction of the ware car forms no part of the present invention, and that Fig. 6 is presented merely to show the manner in which the car-sensing and car-engaging units may be designed to cooperate with a particular type of ware car. It is obvious that different types of ware cars might require somewhat different arrangements of the car-sensing and car-engaging units 27 and 23, or alternatively ware cars differing from those shown in Fig. 6 might readily be modified to cooperate with the particular type of conveyor system shown.

Figure 7:
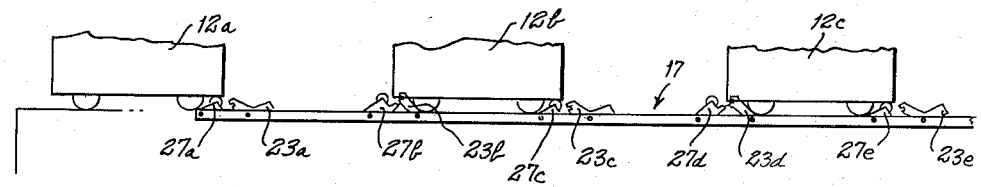
Fig. 7 is a schematic illustration of three ware cars positioned along a track incorporating the present conveyor system.
Figure 8:
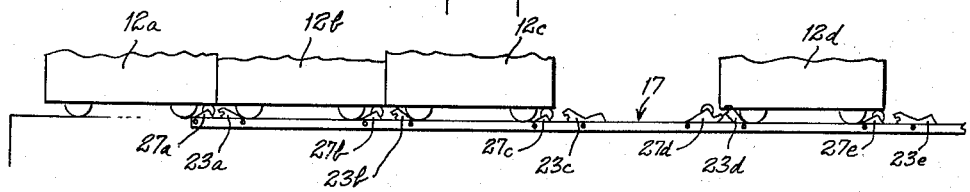
Fig. 8 is a schematic illustration showing four ware cars positioned along a track incorporating the present conveyor system and illustrating the manner in which the car-engaging units are rendered inoperative to avoid carrying the cars beyond the end of the storage track.

The operation of the complete conveyor system will be understood by reference to Figs. 7 and 8. Assume for the moment that thirty car positions are provided along a storage track, and that these positions are numbered starting from the entrance of the storage track from 1 to 30. If then a single car is introduced at the entrance of the storage track at position 1, for each reciprocal operation of the conveyor, the car will be advanced one position from position 1 to position 2 and from position 2 to position 3, etc.

If however, when this first car has been advanced to position 2, a second car is introduced at position 1 and the conveyor is then activated, the first car at position 2 will be advanced to position 3, but the car at position 1 will remain stationary. This result will necessarily come from the inherent mode of operation of the conveyor, namely, that each car-engaging unit is caused to be inoperative if there is a car in the next position. Thus the presence of the car at position 2 would cause the car-engaging unit at position 1 to remain inoperative and hence cause the car at position 1 to remain stationary during the operation of the conveyor.

Once the car at position 2 has been moved to position 3, the car at position 1 would then be moved by successive operations of the conveyor bars 18. It will thus be seen that the normal operation of the conveyor will cause the cars to be moved in such a manner that alternate car positions remain empty and until at least one of the cars reaches the end of the storage track, the cars on the storage track will be located in alternate positions. This is illustrated for example in Fig. 1.

The operation of the conveyor as the first of the storage car reaches the end of the track is illustrated in Fig. 8. As previously explained, the ware cars will progress along the track with a car-length spacing between cars, as shown in Fig. 7. It will be noted, however, that the last car position occupied by car 12a in Figs. 7 and 8 does not have a car-engaging unit arranged to move this last car. When the car 12a reaches the end of the storage track, as shown in Fig. 7, it cannot thenceforth be moved by the operation of the conveyor. Thus on successive operations of the conveyor, the car 12b will be moved up to the position adjoining car 12a and subsequently car 12c will be moved up to the position adjoining car 12b.

It is necessary however that the conveyor be arranged so that the car 12a is not caused to be pushed off of the end of the storage track by succeeding cars 12b and 12c. It will be noted that this is automatically accomplished by reason of the fact that the car-engaging units 23 become disabled when there is a car in the next position. This may be seen by reference to Fig. 8, for example. The car-sensing unit 27a is depressed due to the presence of the car 12a and thus the car-engaging unit 23a is likewise depressed and hence inoperative to engage car 12b to advance it to the end of the storage track. Car-sensing and car-engaging units 27 and 23, in Fig. 8 are shown in their rearmost position and it will be seen that as the conveyor is advanced (that is, moved to the left) engaging units 23a, 23b and 23c will be rendered inoperative. Cars 12b and 12c will therefore not be moved. On the other hand, car-engaging unit 23d is in the operative position due to the absence of a car in the position between cars 12c and 12d. Thus the movement of the conveyor to the left will cause car 12d to be advanced to a position adjacent car 12c.

From the foregoing explanation, it will be obvious that successive reciprocal operations of the conveyor bars 18 will cause ware cars 12 introduced at the entrance of the storage track to be moved along the storage track with car-length spacing between cars until such time as the first car reaches the end of the storage track, at which time the succeeding cars will continue to advance to fill up the alternate spaces on the storage track until the storage track is completely full of cars.

The fact that the ware cars are advanced along the track with a car-length spacing between cars is largely an incidental result of the conveyor arrangement. However, this manner of advancing the cars is particularly advantageous. In the first place the spacing between cars promotes the cooling of the ware on the cars. Secondly, the first car reaches the end of the storage track more promptly and thus is sooner available to be removed from the end of the track. Thirdly, the movement of the cars in a spaced fashion results in only half of the cars on the track being moved at a given time and thus the maximum force required to move the conveyor is approximately halved.

It should be pointed out that although a particular purely mechanical arrangement for sensing the presence of cars and for engaging the cars has been shown, the invention is not limited to such an arrangement. Many equivalent mechanical, electro-mechanical or other arrangements could be devised by a person of ordinary skill to accomplish the same result.

Each cycle of operation of the conveyor could be brought about manually by the operation of a switch, the turning of a valve or the like. However, it is obviously desirable that the conveyor be operated automatically in response to the introduction of a ware car at the entrance of a storage track. An exemplary arrangement to accomplish this result is shown in Fig. 9.

Figure 9:
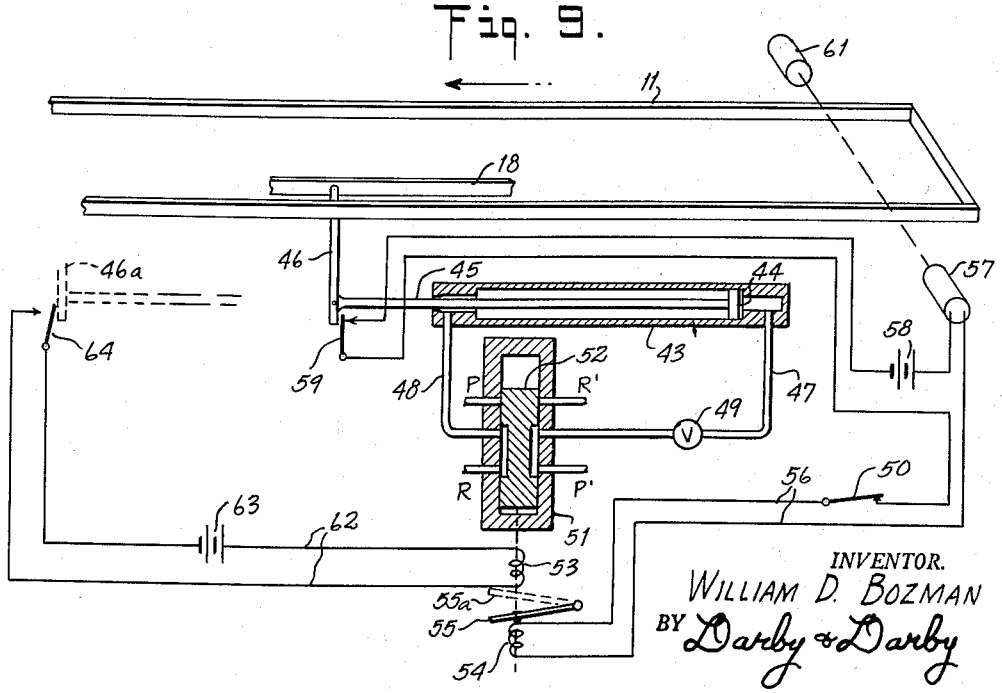
Fig. 9 is a schematic illustration of an exemplary automatic actuator for the ware car conveyor.

The entrance end of a storage track 11 is shown in Fig. 9. A hydraulic cylinder 43 is provided to reciprocate the conveyor bars 18. The hydraulic cylinder 43 contains a piston 44 connected to a piston rod 45 which is coupled by means of a linkage arm 46 to the conveyor bars 18 of the conveyor system. Activation of the hydraulic cylinder 43 to cause a movement of the piston 44 thus causes a corresponding movement of the conveyor bars 18 and the associated car-sensing units 27 and car-engaging units 23. Fluid pressure lines 47 and 48 are connected to opposite ends of the cylinder 43. A valve 49 may be provided in the fluid pressure line 47 to control the speed of advance of the conveyor bars 18. A similar valve could of course be provided in the fluid pressure line 48 to control the return speed if desired.

The fluid pressure lines 47 and 48 are connected to a valve 51 in such a way that one of the two lines is connected to the high pressure side of a pump, pressure tank or other fluid pressure source, while the other line is connected to the low pressure or return side of the source. Movement of the valve armature 52 to the opposite position causes a reversal of the connection of pressure lines 47 and 48. In the position shown in Fig. 9 for example, pressure line 48 is connected to the return or low pressure side of the fluid pressure source while fluid pressure line 47 is connected to the high pressure side of the source. The orientation of the valve armature 52 shown in Fig. 9 would thus cause the piston 44 and hence the linkage member 46 to be moved to its extreme leftward position shown at 46a. Movement of the valve armature 52 to the opposite position would of course cause the piston 44 to be moved to its extreme right position as shown in Fig. 9. The valve 51 is controlled electrically by electromagnets 53 and 54 in conjunction with the magnet armature 55. Obviously a solenoid or motor-controlled valve could also be used. The electromagnet 54 is connected by means of elecrtical leads 56 in a series circuit with a main switch 50, a photo-electrically controlled switch 57, an electrical power source 58, and a limit switch 59. A light source 61 is provided to cooperate with the photo-electrically controlled switch 57, and the light path between the light source 61 and the switch 57 traverses the first car position of the storage track 11. The photo-electrically controlled switch 57 is normally open in the absence of an object obstructing the light path from the light source 61. When a ware car interrupts the light path from the light source 61, the photo-electrically controlled switch 57 is actuated, closing the circuit. It is obvious that a mechanical micro-switch or other sensing device might readily be substituted for the photo-electric arrangement of Fig. 9.

Assume for the purposes of explanation that there is no ware car in the first position on the storage track 11 shown in Fig. 9. The light path from the light source 61 will therefore be uninterrupted. The switch 57 will be open, the electromagnet 54 will not be energized and the armature 55 will be in the position indicated by dotted lines at 55a. The valve armature 52 would therefore be in a position so that the high pressure side of the fluid pressure source is connected to the fluid pressure line 48 (to drive the conveyor mechanism to its rearward position to the right in Fig. 9).

Assume now that a ware car is introduced at the entrance of the storage track 11. The light beam from the light source 61 will thus be interrupted, closing the switch 57 and activating the electromagnet 54. This will cause the valve armature 52 to be moved to the position shown in Fig. 9. In this position the piston 44 is urged to the left causing a forward movement of the conveyor. This movement will continue until the linkage member 46 is driven to its extreme leftward position as shown at 46a, causing the limit switch 64 to be closed.

It will be noted that as the linkage member 46 moves away from the limit switch 59 this switch will open, deactivating the electromagnet 54. However, the electrically-operated valve is arranged to remain in position until it is positively activated to the reverse position. The valve 51 will be positively activated to reverse position when the limit switch 64 is closed, thus completing the circuit formed by the electrical leads 62 and including the electrical current source 63.

Reversal of the position of the valve 51 will cause a high pressure to be introduced into line 48 and thus cause the conveyor to be returned to its initial position. When the conveyor bars 18 return to their initial position, limit switch 59 will again be closed. However, if the ware car that formerly obstructed the beam from the light source 61 has been moved by the operation of the conveyor, the circuit of the electromagnet 54 will still be open due to the open position of the switch 57. Thus if the ware car has been removed from the first position, the conveyor will stop until another car is introduced.

From the previous explanation of the operation of the conveyor it will be remembered that on many occasions a ware car in the first position on the track will not be moved by a single operation of the conveyor, it being first necessary to advance the ware car at the second position on the storage track in order that the car in the first position may be engaged by the conveyor. In many cases it will therefore be necessary to operate the conveyor through two cycles to vacate the first position on the storage track. This will be automatically accomplished by the arrangement of Fig. 9 since the conveyor will continue to reciprocate as long as a ware car remains in the first position on the storage track. As a result, the conveyor would normally reciprocate continuously after the storage track had been filled. If it is desired to prevent this, it may readily be accomplished by opening the main switch 50 so that the conveyor will return to the initial position and remain there.

While it is thought that the arrangement of Fig. 9 is particularly desirable to provide automatic operation of the conveyor system, many equivalent arrangements could be devised, for example, using electrical power rather than hydraulic power or by making numerous other substitutions, omissions or additions to the arrangement of Fig. 9. In fact, the automatic operation provided by the arrangement of Fig. 9 could be dispensed with if desired and the power to operate the conveyor system could be controlled manually.

As another alternative the conveyor could be arranged for slow continuous reciprocation. With this arrangement a car would be advanced to the exit end of the track even though no further cars were placed on that track.

From the foregoing explanation, it will be seen that a particularly simple and efficient conveyor system for rail cars has been provided, and although it has been explained with particular reference to ware cars used in the manufacture of brick, tile and the like, it should be understood that the invention is not limited to this particular application but may be utilized in any application where it is desired to transport a number of like articles according to a predetermined scheme.

A particular embodiment of the present invention has been shown and described, and although certain variations have been pointed out, it should be understood that many other variations and modifications could be made within the scope of the present invention. The scope of the present invention is therefore not to be construed to be limited to the particular embodiment of the invention shown, but is rather to be limited solely by the appended claims.

What is claimed is:

1. A car conveyor for moving cars along the storage track comprising an elongated conveyor structure extending along a plurality of car positions on a storage track, a plurality of flanged wheels rotatably mounted at intervals along said conveyor structure, a conveyor track arranged along said storage track and adapted to support said flanged wheels, driving means for reciprocally moving said structure along said conveyor track over a distance equal at least to one car length, a plurality of car engaging arms pivotally mounted at least one car length apart on said conveyor structure, means for urging said arms to an effective position, a car contacting arm pivotally mounted on said conveyor structure forward of each said engaging arms, means for urging said car contacting arm to an effective position, means for coupling each said car contacting arm to its respective car engaging arm, whereby the presence of a car in contact with said car contacting arm will cause its respective car engaging arm to be moved to an inoperative position.

2. A car conveyor as claimed in claim 1 further including automatic control means for controlling the operation of said driving means comprising stationary sensing means for sensing the presence of a car at the entrance of said storage track, means responsive to said stationary sensing means to cause said driving means to move said conveyor structure to a forward position, and means for causing said driving means to return said conveyor structure to its rearward position.

3. In a car conveyor for moving cars along a predetermined path, an automatic car engagement device comprising a movably mounted car engagement arm, means for urging said arm to an effective position, a car contacting arm movably mounted forward of each said engagement arm, means for urging said car contacting arm to an effective position, and means for coupling said car contacting arm to said car engagement arm, whereby the presence of a car in contact with said car contacting arm will cause said car engagement arm to be moved to an inoperative position.

4. In a car conveyor for moving cars along a storage track, an automatic car engaging device comprising a car engaging unit pivotally mounted on said conveyor and including at least one upwardly extending engaging arm, said arm having a notch in its upper forward end for engaging a portion of said cars, and means for normally urging said arm to an upward position, a car sensing unit pivotally mounted on said conveyor forward of said car engaging unit and including a car contacting arm adapted to contact and be pivoted by one of said cars, a roller rotatably affixed thereto and a counterweight attached to said car contacting arm and adapted to urge said arm to an upward position, and a spring connecting said car sensing unit and said car engaging unit.

5. A car conveyor for moving cars along a storage track comprising an elongated conveyor structure extending along a plurality of car positions on a storage track and arranged for slidable movement in the direction of said track, a plurality of engaging means mounted at least one car length apart on said conveyor structure, and a sensing means associated with each said engaging means for disabling said engaging means in response to the presence of a front car within a predetermined space in front of the car located in position to be engaged by said engaging means, a fluid pressure cylinder, a piston situated within said cylinder, the range of movement of said piston being greater than the aforesaid predetermined space, a piston rod connected to said piston and further connected to move said conveyor structure in conformance with the movement of said piston, a valve for selectively applying a fluid pressure to one of the ends of said fluid pressure cylinder, an electromagnetic device for operating said valve in response to electrical signals applied to one of two sets of terminals, an electric current source, a limit switch adapted to be closed when said piston reaches its extreme forward position, means for connecting said current source and limit switch in a series circuit to one set of terminals of said electromagnetic valve control device, a second limit switch adapted to be closed when said piston reaches its extreme rearward position, a switch adapted to be closed in response to the presence of a car at the entrance to said storage track, an electric current source and means connecting said current source, said second limit switch and said car responsive switch in a series circuit to the other set of terminals of said electromagnetic valve control device.

6. A car conveyor for moving cars along a storage track comprising a pair of parallel conveyor bars situated between the rails of said storage track; a plurality of flanged wheels rotatably mounted at car length intervals on each of said bars; a conveyor track situated between the rails of said storage track and adapted to support said flanged wheels attached to said conveyor bars; a plurality of car engaging units pivotally mounted between said conveyor bars and comprising a pair of upwardly extending car engaging arms, said arms each having a notch in its upper forward end for engaging a portion of said cars, and a counterweight connected to said car engaging arms for normally urging said arms to an upward position; a car sensing unit pivotally mounted between said conveyor bars forward of each said car engaging unit and comprising a car contacting arm, a roller rotatably affixed thereto, and a counterweight attached to said car contacting arm and adapted to urge said arm to an upward position; a spring connecting the upward ends of each said car sensing unit and car engaging unit; a fluid pressure cylinder; a piston situated within said cylinder; a piston rod connected to said piston and further connected to move said conveyor bars in conformance with the movement of said piston; a valve for selectively applying a fluid pressure to one of the ends of said fluid pressure cylinder; an electromagnetic device for operating said valve in response to electrical signals applied to one of two sets of terminals; an electric current source; a limit switch adapted to be closed when said piston reaches its extreme forward position; means for connecting said current source and limit switch in a series circuit to one set of terminals of said electromagnetic valve control device; a second limit switch adapted to be closed when said piston reaches its rearward position; a switch adapted to be closed in response to the presence of a car at the entrance to said storage track; an electric current source; and means connecting said current source, said second limit switch, and said car responsive switch in a series circuit to the other set of terminals of said electromagnetic valve control device.

7. In a car conveyor for moving cars along a predetermined path, an automatic car engagement device comprising a movably mounted car engagement arm, said car engagement arm being movable to an effective position to engage a car to cause movement of said car with one direction of movement of said conveyor but not with movement in the opposite direction, means for urging said arm to an effective position, a car contacting arm movably mounted forward of each said engagement arm, means for urging said car contacting arm to an effective position, and means for coupling said car contacting arm to said car engagement arm whereby the presence of a car in contact with said car contacting arm will cause said car engagement arm to be moved to an inoperative position.

References Cited in the file of this patent

UNITED STATES PATENTS

| | | |
|---|---|---|
| 562,881 | Ball | June 30, 1896 |
| 743,612 | Acklin | Nov. 10, 1903 |
| 1,743,782 | Kershaw | Jan. 14, 1930 |
| 2,101,353 | Waalkes | Dec. 7, 1937 |
| 2,461,770 | Puccinelli | Feb. 15, 1949 |
| 2,583,968 | Rosseau | Jan. 29, 1952 |
| 2,612,847 | Burrows | Oct. 7, 1952 |
| 2,619,370 | Leger | Nov. 25, 1952 |
| 2,619,916 | Rainier | Dec. 2, 1952 |
| 2,635,555 | Hansson | Apr. 21, 1953 |
| 2,645,186 | Davis | July 14, 1953 |
| 2,741,190 | King | Apr. 10, 1956 |